United States Patent [19]

Daniels et al.

[11] Patent Number: 4,619,504

[45] Date of Patent: Oct. 28, 1986

[54] OPHTHALMIC LENS WITH A MARKING AND METHOD OF PRODUCING THE MARKING

[75] Inventors: Erwin J. Daniels; Bernd Kratzer; Hermann Schürle, all of Aalen, Fed. Rep. of Germany

[73] Assignee: Carl-Zeiss-Stiftung, Heidenheim, Fed. Rep. of Germany

[21] Appl. No.: 528,894

[22] Filed: Sep. 2, 1983

[30] Foreign Application Priority Data

Sep. 10, 1982 [DE] Fed. Rep. of Germany ....... 3233590

[51] Int. Cl.⁴ ..................... G02C 7/10; G02C 7/02; B05D 1/32
[52] U.S. Cl. ..................... 351/163; 351/159; 351/165; 351/177; 427/162; 427/259
[58] Field of Search ............... 351/159, 163, 164, 165, 351/177; 427/160, 162, 259

[56] References Cited

U.S. PATENT DOCUMENTS

| | | | |
|---|---|---|---|
| 3,914,464 | 10/1975 | Thomasson et al. | 427/259 X |
| 3,981,568 | 9/1976 | Bartolomei | 427/160 X |
| 4,045,125 | 8/1977 | Farges | 351/44 X |
| 4,145,125 | 3/1979 | Chika | 351/165 |
| 4,188,417 | 2/1980 | Lichtenberg | 427/259 X |

FOREIGN PATENT DOCUMENTS 52-42129  4/1977  Japan .................................... 351/51

OTHER PUBLICATIONS

Pacey, D. J., "Antireflection Coatings for Ophthalmic Lenses"; *The Optician;* vol. 147, No. 3821, Jun. 26, 1964, pp. 633-637.

*Primary Examiner*—John K. Corbin
*Assistant Examiner*—Scott J. Sugarman
*Attorney, Agent, or Firm*—Walter Ottesen

[57] ABSTRACT

The invention is directed to an ophthalmic lens having a marking and a method of producing the same. The lens is suitable for spectacles and the like. The method includes applying a removable adhering substance to a region of the surface of the lens body so that the peripheral outline of the substance corresponds to the marking to be formed. Then, an anti-reflection coating is applied to the lens body and, at a time thereafter, the adhering substance and the portion of the coating covering the substance is removed thereby causing a recess to be formed in the coating having a peripheral outline defining the marking. The marking formed in this way is practically invisible to a person wearing spectacles equipped with the lens of the invention. On the other hand, the marking is clearly visible when viewed in reflected light.

11 Claims, 3 Drawing Figures

OPHTHALMIC LENS WITH A MARKING AND METHOD OF PRODUCING THE MARKING

FIELD OF THE INVENTION

The invention is directed to an ophthalmic lens for spectacles and the like having an anti-reflection coating and a marking which is practically invisible to a person wearing the spectacles. The marking can be an identifying mark and/or another type of mark such as a control mark or the like. If desired, the marking can include more than one mark.

BACKGROUND OF THE INVENTION

Spectacle lenses are most often provided with an identifying mark from which the manufacturer can be identified. This is especially important in the case of a claim or an objection which is sometimes made after the product has been used for a while. Accordingly, this type of identifying mark on the spectacle lens itself must be in a permanent form. On the other hand, the marking should not disturb the person wearing the spectacles during normal use thereof. More specifically, the marking should not be visible to such a person.

With non-rotational symmetrical spectacle lenses such as toric and bifocal lenses, the spectacle lens has a marking which provides the optician with a control so that he may fit the lens into the spectacle frame without difficulty. A marking of this type should likewise be invisible to a person wearing the spectacles.

It is known to apply a marking to a spectacle lens by means of a very fine mechanical engraving. This method is very expensive and requires substantial effort. It is further known to produce an etched marking by etching away a portion of the glass. However, this method requires that the entire remaining portion of the lens be covered with an enamel coating or the like which must later be removed. Accordingly, this method too requires a substantial expenditure. Markings are also known which are applied to the lens with a stamp in the form of the desired marking. In this method, certain substances are applied to the lens surface which cause the region of the marking to have a degree of wettability different from that of the remaining surface of the lens. This type of marking is made visible for a short time by exhaling onto the lens. The disadvantage of this kind of mark is that it lasts for only a limited time.

All of the methods described above have in common that they must be performed with a great deal of care and therefore with relatively large amount of effort so that on the one hand, a good visibility is achieved for the optician while, on the other hand, the person wearing the glasses will hardly notice the marking. This and other rather contradictory requirements can only be achieved by maintaining tight tolerances.

The tight tolerances of this kind are best controlled and maintained by means of a likewise known method by which a suitable substance is vaporized onto the spectacle lens with aid of a mask or template. The masks or templates have openings formed therein which correspond to the desired marking so that the substance is applied to the lens only in the form of the marking. With templates which are mounted directly in front of the spectacle lens even with only very limited spacing, there is however the disadvantage that the marking will not be sharply defined at the edges thereof.

Austrian Pat. No. 346,627 discloses masks made of a metal suspension and applied by vaporization. These masks are used in the production of dielectric coatings in patterned distribution, for example, for plates with phase rings, filter coatings which cover only a portion of the filter plate as well as for decorative lettering and ornamental patterns. The metal coating is utilized as a coating defining a mask which must be removed by dissolving the same using a dissolving solution after the dielectric coating is vaporized onto the plate.

Notwithstanding the good results obtained for a mass-produced article such as spectacle lenses with this type of method, it is evident that a method of this kind is also very expensive in terms of cost and effort because of the production of the masks, the vaporization procedure and the subsequent difficult removal of the masks.

SUMMARY OF THE INVENTION

In view of the foregoing, it is an object of the invention to provide a spectacle lens having a marking which is easily visible to the optician and which remains virtually unseen by the person wearing the spectacles. It is a further object of the invention to provide an economical method of producing the marking.

The ophthalmic lens of the invention for spectacles or the like includes a lens body and an anti-reflection coating formed on the surface of this body. The marking is defined by recess means in the form of at least one void in the anti-reflection coating.

A preferred embodiment of the method of the invention for producing the ophthalmic lens having a marking includes the steps of applying a removable adhering substance to a region of the surface of the lens body so that the peripheral outline of the substance corresponds to the marking to be formed; then applying an anti-reflection coating to the lens body and, at a time thereafter, removing the adhering substance and the portion of said coating covering said substance thereby causing a recess to be formed in said coating having a peripheral outline defining the marking.

Thus, the marking is not applied to the lens in a separate production cycle as was previously done; rather, the step of applying the marking is integrated into other production cycles. Most spectacle lenses are in any event provided with an anti-reflection coating. The only additional production procedure is in applying the removable adhering substance. The adhering substance including the pertinent portion of the anti-reflection coating covering the same is removed later after the lens has been ground by the optician who in the course of his work wipes the lens clean many times.

In an advantageous embodiment of the ophthalmic lens of the invention, a removable adhering substance is used which is also easily visible. In this way, the marking is especially visible before the optician subjects the lens to the first cleaning. This makes the work of the optician easier.

The region defined by the recess or recesses can be made directly in the form of the marking; or, the recess region can surround the marking. For example, a void can be formed in the anti-reflection coating in the form of the letters C and Z or, the letters can remain as part of the anti-reflection coating and are individually or jointly surrounded by a void in the coating. This is applicable also to other marks. The recess in surrounding relationship to the marking has the advantage that the marking can be very fine and, this fineness notwithstanding, the marking is easily found because of the relatively large recess region in surrounding relationship thereto.

In an especially advantageous embodiment of the invention, the removable adhering substance is applied to the spectacle lens with a stamp. This step is preferably performed after the cleaning step which is conducted before the anti-reflection coating is applied by vaporization. Experience has shown that a conventional stamp ink is adequate.

In another advantageous embodiment, the removable adhering substance is sprayed onto the spectacle lens through a mask that is arranged tightly in front thereof. A likewise useable method is the well known screen printing process.

In a further especially advantageous embodiment of the invention, the removable adhering substance is applied by using an intaglio printing process. In this process, a plate is provided with recesses in the form of the desired printing pattern. The recesses are filled with a suitable printing ink and the surplus ink is wiped away. Subsequently, the printing pattern is taken up from the plate with a resilient printing roller and transferred to the spectacle lens. In this instance, the printing process advantageously precedes the cleaning step which must be performed before the anti-reflection coating is applied by vaporization to the lens. Accordingly, a printing ink must be used which can withstand ultrasonic cleaning and remain unchanged. For this purpose, a two-component ink commercially available as Wiedosil Z having a hardener ZH is preferable and can be obtained from the Wiedehold Company. In this instance, the substance can be dissolved with a dissolving solution such as removal fluid X 500 manufactured by the Antony Company. Both the Wiedehold Company and the Antony Company are corporations doing business in the Federal Republic of Germany.

DESCRIPTION OF THE PREFERRED EMBODIMENTS OF THE INVENTION

Figure 1:
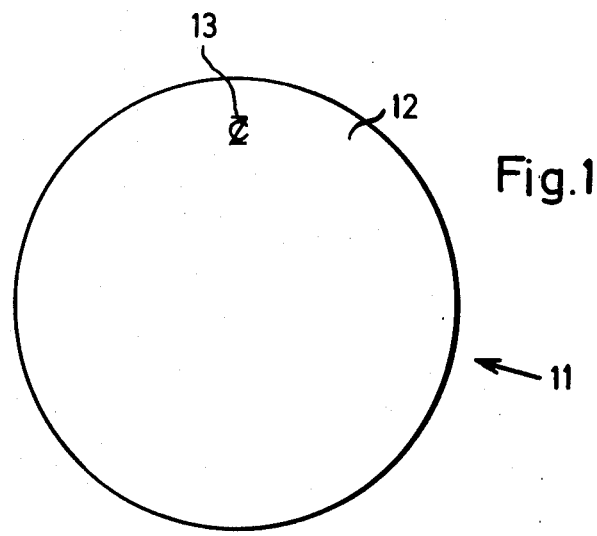
FIG. 1 is a plan view of a spectacle lens wherein an identifying mark has been formed in the anti-reflection coating thereof.

In FIG. 1, reference numeral 11 indicates a spectacle lens which is almost completely covered by the anti-reflection coating 12. Only the manufacturer's identifying mark 13 consisting of the letters C and Z have been carved out of the coating. These letters are shown enlarged in FIG. 2. The removable adhering substance is applied to the spectacle lens 11 at the location of the letters defining the marking 13 and, after the anti-reflection coating 12 is vaporized onto the lens, the lens is wiped so that the marking 13 remains as a void or recess in the anti-reflection coating. During normal use of the lens, the carved out region is not noticeable. However, by proper viewing of the lens in reflected light, the marking is clearly recognizable.

Figures 2, 3:
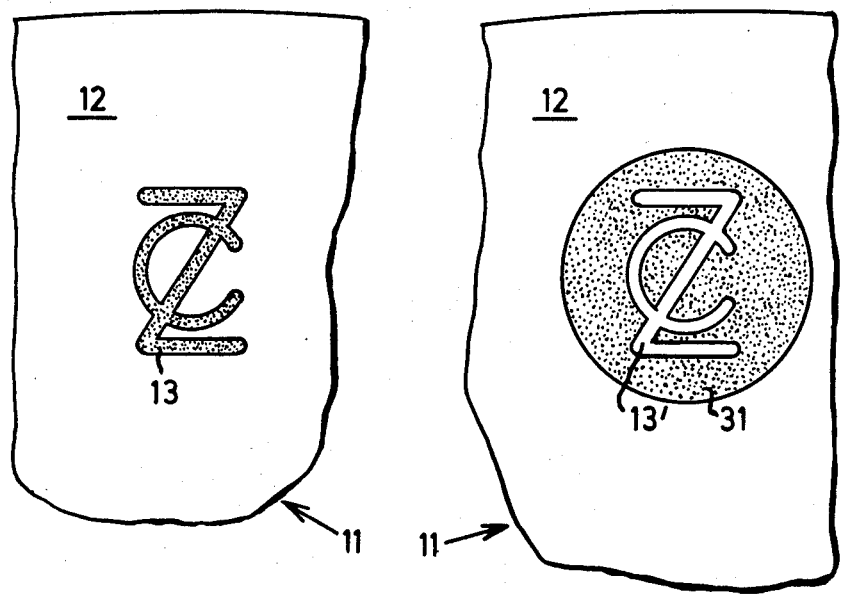
FIG. 2 is an enlarged view of the mark of the lens of FIG. 1.
FIG. 3 illustrates another form that the mark can take wherein the coating surrounding the mark has been removed so that the anti-reflection coating itself defines the marking.

FIG. 3 shows the same marking whereby the removable adhering substance is applied so that the marking 13', after wiping, is in the form of the anti-reflection coating and is surrounded by a void or recess 31 where there is no coating.

The marking can of course be made in the form of any other letters or symbols. As a marking, all conventional forms are possible.

It is understood that the foregoing description is that of the preferred embodiments of the invention and that various changes and modifications may be made thereto without departing from the spirit and scope of the invention, as defined in the appended claims.

What is claimed is:

1. An ophthalmic lens comprising: a lens body; a removable substance adhering to a region of the surface of said lens body and having a periphery defining an identification or control marking having a predetermined outline for conveying information to one viewing the same; and, an anti-reflection coating adhering directly to said surface outside of said region so as to completely surround said substance whereby the peripheral interface between said substance and said coating defines the outline of said marking.

2. The ophthalmic lens of claim 1, said removable substance being a substance that is clearly visible.

3. Method of producing an opthalmic lens having an identification or control marking at a preselected location thereon, the method comprising the steps of:
applying a removable adhering substance directly to a region of the surface of the lens body, said region having a periphery corresponding to the marking to be formed;
then applying an anti-reflection coating directly to the surface of the lens body outside of said region so as to completely surround said substance; and,
forming a permanent recess in said coating by removing said substance whereby the peripheral outline of said recess defines said marking.

4. The method of claim 3 wherein said substance is a substance that is clearly visible.

5. The method of claim 3 wherein the removable adhering substance is applied to the lens by spraying the same through a template.

6. The method of claim 3 wherein the removable adhering substance is applied to the lens by screen printing the same thereon.

7. Method of producing an opthalmic lens having an identification or control marking at a preselected location thereon, the method comprising the steps of:
applying a removable adhering substance to a region of the surface of the lens body so that the peripheral outline of the substance defines the marking;
thereafter applying an anti-reflection coating to the lens body including said substance; and
said removable adhering substance being removable so as to also remove said anti-reflection coating covering said substance whereby said anti-reflection coating disposed in surrounding relation to said substance defines said marking.

8. The method of claim 7, said removable adhering substance being a substance that is clearly visible.

9. Method of producing an ophthalmic lens having an identification or control marking at a preselected location thereon, the method comprising the steps of:
cleaning the lens body;
stamping a removable adhering substance directly to a predetermined region of the surface of the lens body with a stamp;

applying an anti-reflection coating directly to the surface of the lens body outside of said region so as to completely surround said substance; and, dissolving said substance thereby forming a recess in said coating having a peripheral outline defining the marking.

10. The method of claim 9 wherein the adhering substance is a conventional stamp ink.

11. Method of producing an ophthalmic lens having an identification or control marking at a preselected location thereon, the method comprising the steps of:
 transferring ink in the form of the marking from an intaglio plate to the surface of the lens body with a resilient printing roller;
 applying an anti-reflection coating directly to the surface of the lens body in surrounding relationship to the ink so as to completely surround the ink; and,
 dissolving the ink thereby forming a recess in said coating having a peripheral outline defining the marking.

* * * * *